UNITED STATES PATENT OFFICE.

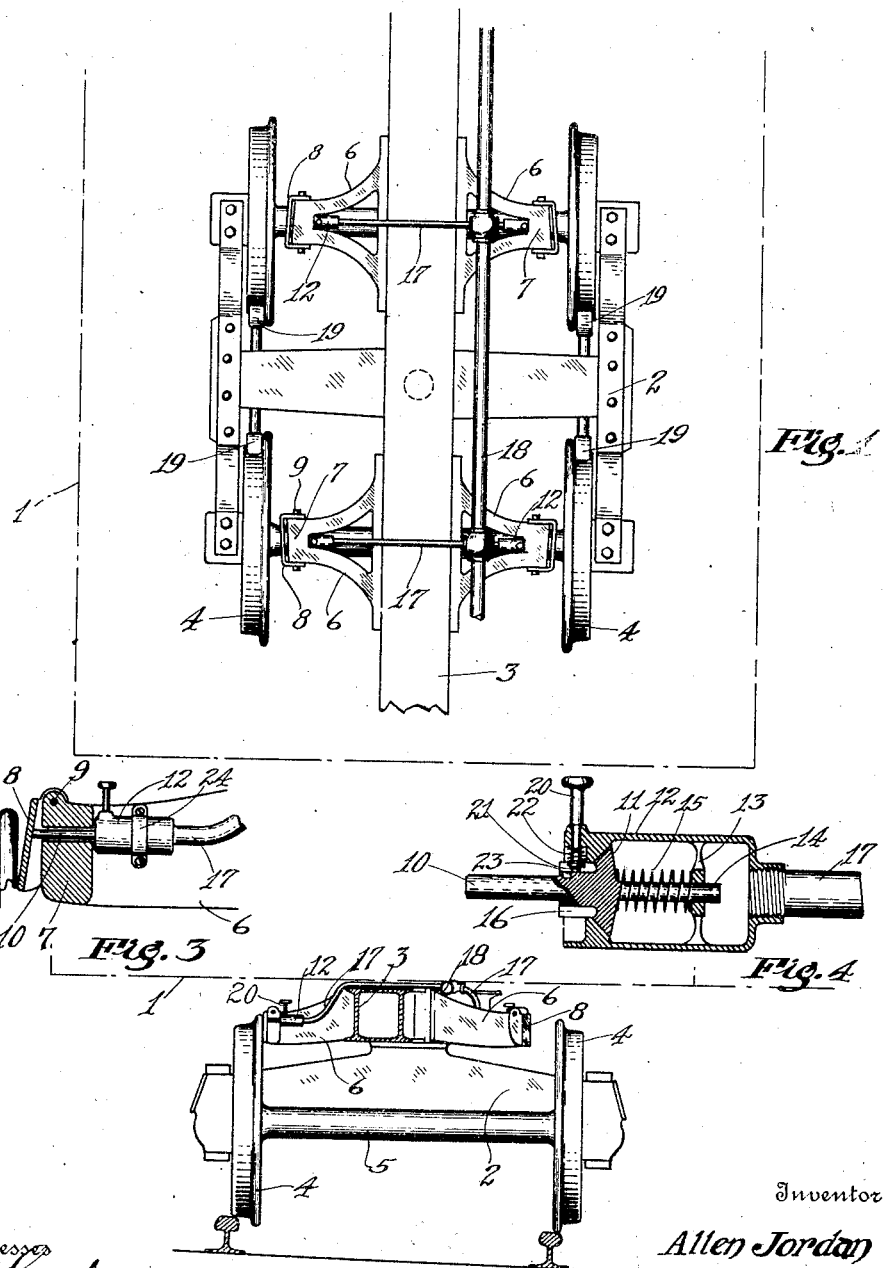

ALLEN JORDAN, OF BIRMINGHAM, ALABAMA, ASSIGNOR OF ONE-THIRD TO J. R. PILL, OF BIRMINGHAM, ALABAMA.

SAFETY ATTACHMENT FOR ROLLING-STOCK OF RAILROADS.

1,048,078. Specification of Letters Patent. Patented Dec. 24, 1912.

Application filed March 25, 1912. Serial No. 685,930.

*To all whom it may concern:*

Be it known that I, ALLEN JORDAN, a citizen of the United States of America, residing at Birmingham, in the county of Jefferson and State of Alabama, have invented certain new and useful Improvements in Safety Attachments for Rolling-Stock of Railroads, of which the following is a specification.

My invention relates to attachments on the bodies of cars, locomotives, or other rolling stock of railroads adapted to prevent not only the derailing of the truck wheels, but also the sluing of the truck after derailment which is one of the most serious causes of destructive accidents, and as an additional precaution my apparatus is adapted to automatically set the brakes on the car or train when the truck wheels assume an abnormal position.

The object of my invention is to simplify and reduce the cost of safety means of the character described, to make it available for general use without prohibitive expense, and to this end I have conceived the idea of attaching to the car or locomotive body, sets of strong metal lugs or stops so arranged relatively to the wheels that when a truck moves beyond its normal angular adjustments in following the track curves one or more of its wheels will engage a lug which will stop any further angular movement of the truck and either prevent the derailment of the wheels or hold the wheels when derailed in substantial alinement with the track, the lugs being preferably spaced so as to engage the wheels before the truck can swing sufficiently out of alinement to become derailed.

A further object of my invention is to provide a mechanism whereby the angular play of a truck beyond normal operating positions in rounding curves, will act to set the brakes, my preferred arrangement being the mounting of valves on or adjacent to the lugs and adapting the wheels of the truck to open a valve, when they engage the lug and set the brake. Inasmuch as it is desirable to hold a valve open, after it has been once actuated by a wheel, until all of the air in the train line system is exhausted to thereby effect an emergency application of air on the entire brake system of the train, I provide a catch which will automatically engage and hold the valve in its open position until released by hand.

My invention further comprises the details of construction and arrangement of parts, which, in their preferred embodiment, are hereinafter more particularly described and claimed, reference being had to the accompanying drawings which form a part of this specification, and in which:—

Figure 1 is a top plan view of my apparatus with the car shown in dotted lines. Fig. 2 is a front elevation of a car body equipped with my improvement and in the act of arresting a truck, the wheels of which are about to be derailed. Fig. 3 is a detail vertical sectional view through the ends of the stop plate. Fig. 4 is a detail view of the valve mechanism for automatically setting the air brakes.

Similar reference numerals refer to similar parts throughout the drawings.

I illustrate the preferred embodiment of my invention applied to a railway car 1, which is shown in dotted lines and has trucks 2 of any standard construction, which are swivelly connected to the center beam 3 of the car. The truck illustrated is of the standard four wheel type, the wheels 4 being fixed on axles 5 which are suitably journaled in the truck. To each side of the center beam above each axle 5 I bolt or otherwise rigidly attach a pair of heavy triangular metal stop plates 6 which project equi-distantly on each side of the center beam, their outer ends 7 being normally spaced a short distance from the inner walls of their respective adjacent wheels 4. Each stop plate has a wear plate 8 pivotally connected thereto by a pin 9 which passes through the inturned side edges of the plate 8 and through an upper extension on the end 7 of the stop plate. This wear plate is readily detachable and interchangeable. It is normally held out from the end 7 of the stop plate by the stem 10 of a valve 11, which is mounted in a valve casing 12 having a spider 13 forming a bearing for a guide stem 14 for the valve. A coiled spring 15 is slipped over stem 14 and bears at one end against the spider 13 and at the other against valve 11. This spring urges the valve toward its seat and thereby moves the stem 10 to hold the wear plate 8 in the position shown in Fig. 3. The valve has wings 16 to guide and center its outer end. The casing 12 is suitably mounted in the center opening in each triangular stop plate 6 and is connected by a pipe 17 to the train line pipe 18 of the air brake system. The apparatus for applying the brakes 19 is not illustrated, as the same is of standard construction, and adapted, when one or more valves 11 are opened by the truck wheels, to reduce the air pressure throughout the air brake system, causing the application of the brakes. To insure quick emergency application of the brakes it is necessary to practically exhaust the air pressure in the train line and to this end I find it advisable to hold the valve or valves 11 open after each is opened by the engagement of a wheel with its respective plate 8, which is moved thereby to shift stem 10 inwardly and open the valve. I provide a pin 20 which projects above the casing 12 and has its lower end forming a catch 21 which is urged downward by a coiled spring 22 in position to snap into a seat 23 formed between two wings 16, when the valve is open, the catch being adapted to positively and automatically engage the valve to hold it in its open position until the pin is grasped by hand and raised against the action of spring 22 to release the valve, when its spring 15 will close it.

In operation, the stop plates are so set that provision being made for the longitudinal play of the wheel axle and for tl swinging of the trucks in following the shortest curve permissible in standard railroad practice, the wheels will not strike said stops until the truck assumes an abnormal position, due to the wheels tending to climb the rail or to slue when the truck is derailed from any cause. In Fig. 2 the stop is shown arresting the swing of the truck system before the wheel flange clears the tread of the rail to derail the truck. This use of my invention is of great importance.

A further and most important use is that when the truck is derailed from any cause, such as a split or broken rail, an open switch, or even from the removal of a rail, the stops will prevent the truck from sluing and tearing up the track and wrecking the car for they will engage the inner faces of the wheels and cause them to run over the road-bed in substantial alinement with the track. The application of the air brakes is controlled by an abnormal position of the wheels and will immediately set the brakes throughout the train. The stop plates may be of any desired construction and applied in any practical way to the car or engine, it being understood when I use the term car that I mean engine or any other type of rolling stock. The stops will project down sufficiently to insure their engaging the wheels after the latter have been derailed, which frequently causes them to drop substantially below the normal position on the rail with reference to the car body.

The end 7 of the stop plate 6 may, if desired, be beveled outwardly from the center of the truck and toward the center line of the car to make it parallel to the face of its respective wheel as the latter is swung about the center pivot and into position to engage it.

What I claim as new and desire to secure by Letters Patent, is:—

1. In an apparatus of the character described, the combination of wheels, a truck, a car body to which said truck is adjustably connected, stop lugs rigidly connected to said car body and adapted to engage said wheels and stop them before they move beyond a predetermined distance out of normal alinement, and means actuated by said wheels when they assume an abnormal position to set the brakes on the car, substantially as described.

2. In combination with a car body, a truck, wheels journaled in the truck, and heavy metal lugs rigidly attached to and depending from the car body in position to engage the wheels when they swing angularly in a horizontal plane beyond predetermined normal operating positions.

3. In combination, a railway car body, trucks pivotally connected thereto, wheels mounted in the trucks, and means to prevent angular movements of the trucks beyond normal operating positions which comprise stop lugs rigidly connected to the car body and adapted to be engaged by the inner faces of the wheels when the truck moves abnormally out of line.

4. In combination, a railway car or locomotive body, a truck frame pivoted thereto and provided with wheels, two or more heavy metallic lugs rigidly attached to said body and positioned adjacent to the inner faces of the wheels of each truck, said lugs being adapted to engage the wheels and arrest the angular movement of the trucks beyond predetermined normal operating positions.

5. The combination of a car body, trucks pivotally connected thereto and wheels mounted in the trucks, of stop plates connected to the car body and depending into position to be engaged by the inner faces of the wheels when the truck swings beyond predetermined normal operating positions, and detachable wearing plates mounted on the ends of said stop plates, substantially as described.

6. The combination of a car body having a center beam, trucks pivotally connected to said beam, wheels mounted on the trucks, a pair of oppositely disposed stop plates connected to said beam opposite each pair of wheels, the outer end of said plates being spaced sufficiently from the inner faces of the wheels to permit the truck to swing angularly throughout its normal operating positions before a wheel thereof will engage its respective stop, and valves disposed adjacent to said stop or stops and having an operating stem adapted to be engaged and moved by a wheel as it swings into contact with a stop plate, said valves acting to reduce the pressure in the train line of the air brake system to set the brakes, substantially as described.

7. The combination with a car body, a truck pivotally connected thereto and wheels journaled in the truck, of stop lugs rigidly connected to the body of the car and adapted to be engaged by the wheels when the truck swings horizontally to an abnormal position, an air brake system having pipes leading to two or more of said stop lugs, and valves carried by two or more of said lugs and adapted to be engaged and opened by the wheels as they swing into engagement with the stops, said valves when open acting to set the air brakes, substantially as described.

8. A car body having depending lugs, wheels on which the car is supported and which are adapted to engage said lugs before swinging angularly in a horizontal plane sufficiently to become derailed, wear plates pivoted to the ends of said stops, valves carried by said stops and having spring-pressed stems engaging the inner face of said wear plates and holding the same normally away from the stops, each valve being connected to the air brake system and being adapted to be opened when a car wheel engages its respective wear plate and moves it inwardly, substantially as described.

In testimony whereof I affix my signature in presence of two witnesses.

ALLEN JORDAN.

Witnesses:
 NOMIE WELSH,
 R. D. JOHNSTON.